United States Patent [19]

Umeda et al.

[11] Patent Number: 5,068,769
[45] Date of Patent: Nov. 26, 1991

[54] HORIZONTAL SIGHTING APPARATUS FOR HEAD-LAMPS

[75] Inventors: Toru Umeda, Funabashi; Hidetaka Kondo, Tokyo; Kouichi Kato, Yokohama, all of Japan

[73] Assignee: Stanley Electric Co., Ltd., Tokyo, Japan

[21] Appl. No.: 551,939

[22] Filed: Jul. 12, 1990

[30] Foreign Application Priority Data

Jul. 20, 1989 [JP] Japan .................................. 1-85275

[51] Int. Cl.5 .............................................. B60Q 1/00
[52] U.S. Cl. ..................................... 362/61; 362/273; 362/289; 362/427; 33/288
[58] Field of Search .................... 362/66, 69, 273, 61, 362/282, 289, 418, 80, 285, 287, 427, 428; 356/248; 33/288

[56] References Cited

U.S. PATENT DOCUMENTS

| 2,826,682 | 3/1958 | Falge | 362/273 |
| 4,843,523 | 6/1989 | Nakamura | 362/69 |
| 4,882,658 | 11/1989 | Allen | 362/289 X |
| 4,922,387 | 5/1990 | Ryder et al. | 362/80 |
| 4,984,136 | 1/1991 | Yamagishi et al. | 362/80 |

FOREIGN PATENT DOCUMENTS 637163 2/1962 Canada .............................. 362/273

Primary Examiner—Ira S. Lazarus
Assistant Examiner—D. M. Cox
Attorney, Agent, or Firm—Frishauf, Holtz, Goodman & Woodward

[57] ABSTRACT

A horizontal sighting apparatus for head lamps, in which an index portion having an index moved by adjusting an adjusting screw is brought into engagement with the adjusting screw. A mating-index portion having a mating-index is provided on the lamp housing at a position confronting the index portion. The index portion and the mating-index portion are capable of being aligned with each other irrespective of an adjustment amount of the adjusting screw.

6 Claims, 3 Drawing Sheets

HORIZONTAL SIGHTING APPARATUS FOR HEAD-LAMPS

BACKGROUND OF THE INVENTION

1. Field of the Invention

The present invention relates to head lamps for an automobile, and more specifically to a method and apparatus for horizontal sighting of the head lamps when the head lamps are mounted on a vehicle body.

2. Description of the Prior Art

FIG. 5 shows a conventional horizontal sighting apparatus for head lamps 31 and 31. An automobile 32 having head lamps 31 and 31 mounted thereon is positioned on a horizontal adjusting surface, said head lamps 31 and 31 being designed to be rotatable in a horizontal direction by rotational shafts 31a and adjusting screws 31b. Sighting units 33 and 33 are mounted on aiming bosses 31c, respectively, provided on lenses of the head lamps 31 and 31. The adjusting screws 31b are adjusted while looking through by scopes 33a and 33a (which reflect light at right angles) provided on the sighting units 33 and 33, whereby the head lamps 31 and 31 are set parallel with the moving direction of the automobile 32. By using the sighting units 33 and 33, adjustment of the head lamps can be made without the lamps 31 being lighted.

However, in the above-described conventional sighting method, the sighting units 33 and 33 are necessary. Thus, there poses a problem in that when the head lamps 31 need to be re-adjusted, a general automobile user who is not normally provided with such devices (i.e., the sighting units 33, 33) cannot make accurate re-adjustment.

In addition, in modern automobiles 32, head lamps called heteromorphous head lamps and made for a design of an automobile tend to be often employed. As a result, special sighting units provided with an adjusting function must be specially made for the design of an automobile, thus posing a problem that a repair shop confronts troublesome handling. Moreover, the automobile manufacturer cannot employ head lamps 31 other than those in which the lenses rotate as sighting takes place, thus bringing forth a problem that causes a restriction in terms of design. These aforementioned problems have been required to be solved.

SUMMARY OF THE INVENTION

For solving the aforementioned problems noted above with respect to the conventional sighting apparatus, the present invention provides a horizontal sighting apparatus for head lamps, said head lamps having a horizontal sighting mechanism and an adjusting screw, wherein an index portion having an index moved by adjusting the adjusting screw is brought into engagement with said adjusting screw, and wherein on a housing for the head lamps, a mating-index portion having a mating-index is provided at a position confronting said index portion, said index portion and said mating-index portion being capable of being coincided with each other irrespective of an adjustment amount of said adjusting screw.

DESCRIPTION OF THE PREFERRED EMBODIMENTS

Figure 1:
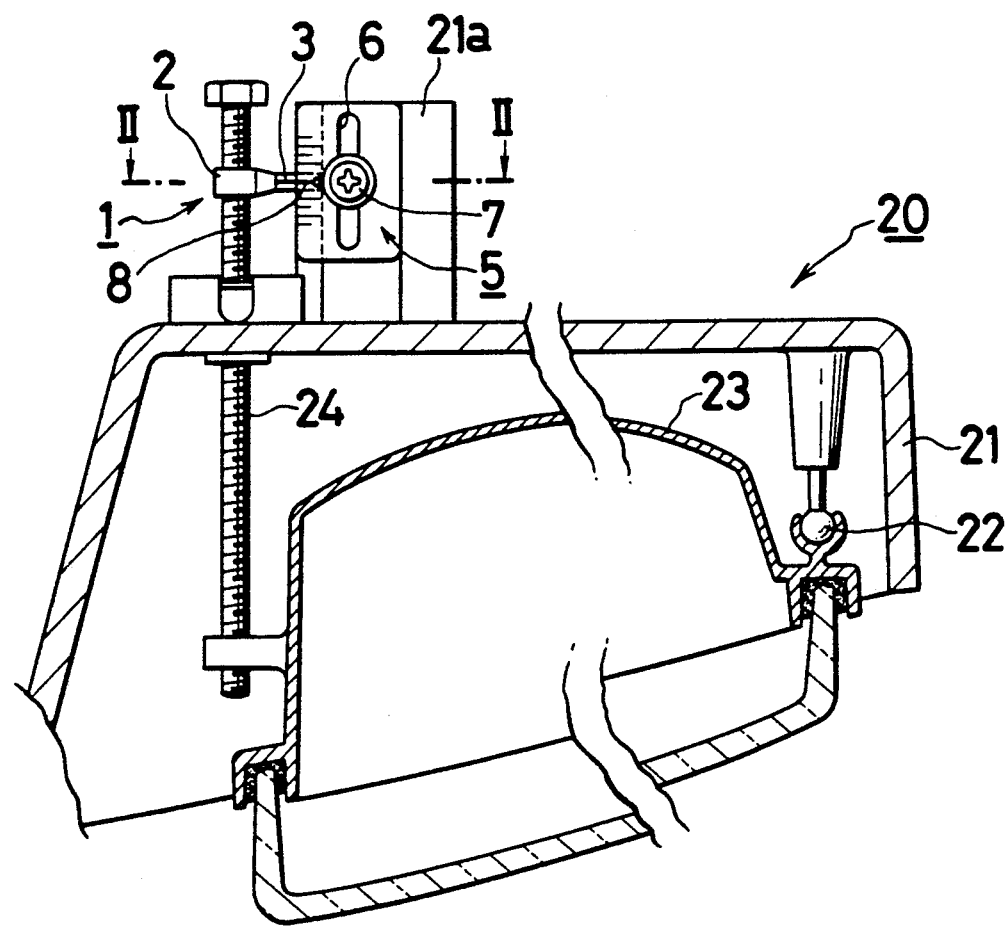
FIG. 1 is a plan view showing essential parts in section of a horizontal sighting apparatus for head lamps according to a first embodiment of the present invention.

Referring to FIG. 1 showing a first embodiment of the present invention, a head lamp is indicated at 20. The head lamp 20 comprises a housing 21 with a reflecting mirror 23 having one end, which is horizontal in a mounting state to a vehicle, supported on said housing 21 by means of a ball joint 22, and an adjusting screw 24 threadedly mounted on the other end in a horizontal direction of the reflecting mirror 23, said adjusting screw 24 extending externally of the housing 21. This adjusting screw 24 is rotated to render horizontal sighting possible.

In the first embodiment, the adjusting screw 24 has an index portion 1 mounted thereon. The index portion 1 comprises a nut 2 threadedly engaged with the adjusting screw 24 and an index member 3 formed integral with the nut 2. The housing 21 is provided with a shelf-like portion 21a along the adjusting screw 24. On the shelf-like portion 21a is mounted a mating-index portion 5 provided with a mating-index 8. The mating-index portion 5 is movable in an elongated groove 6 provided parallel with the adjusting screw 24 and capable of being locked by means of a mounting screw 7 or the like at a desired position after having been moved.

Figure 2:
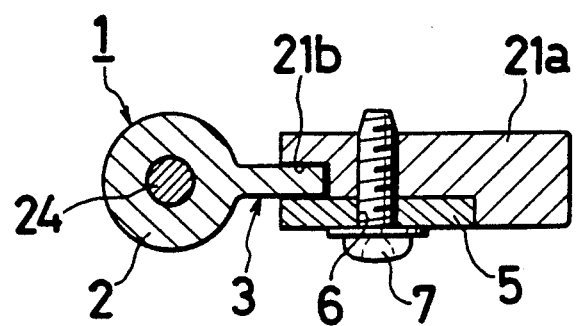
FIG. 2 is a sectional view taken on line II—II of FIG. 1.

FIG. 2 shows in more detail the index portion 1 and the mating-index portion 5. The nut 2 of the index portion 1 is held in a groove-like portion 21b formed by the shelf-like portion 21a and the mating-index portion 5 so as to prevent the nut 2 from being rotated together with the adjusting screw 24 when the adjusting screw 24 is rotated for adjustment. Thereby, the index member 3 is moved in a direction parallel with the axial direction of the adjusting screw 24 by the rotation of the adjusting screw 24.

In carrying out the horizontal sighting of the head lamps 20 by the index portion I and the mating-index portion 5 constructed as described above, the automobile manufacturer carries out a primary horizontal sighting to be a reference for the head lamp 20 mounted on the vehicle body by a suitable sighting apparatus, for example, such as the sighting apparatus described in the prior art and the adjusting screw 24.

After the aforesaid horizontal sighting has been made, the mounting screw 7 is loosened to move and adjust the mating-index portion 5 such that the index member 3 and the mating-index 8 are brought into coincidence with each other, and they are locked again by tightening mounting screw 7. Then, the index portion I and the mating-index portion 5 assume the state of the aforesaid primary horizontal sighting. Even if a state occurs where the adjusting screw 24 is rotated for some reason, such as due to a repair after shipment by the automobile manufacturer, the adjusting screw 24 is rotated so that the index member 3 and the mating-index 8 again coincide with each other to again obtain the state of the aforementioned primary horizontal sighting.

Figure 3:
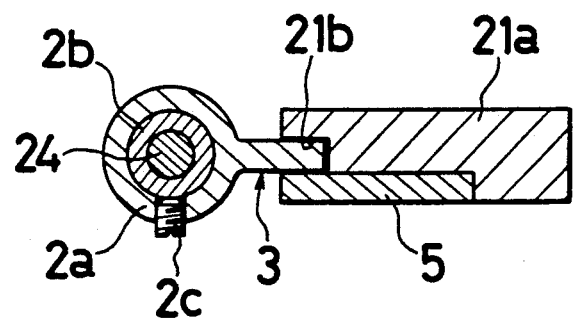
FIG. 3 is a sectional view showing essential parts according to a second embodiment of the present invention.

FIG. 3 shows essential parts of the second embodiment according to the present invention. A portion corresponding to the nut 2 in the embodiment before being threadedly engaged with the adjusting screw 24 is divided into a nut portion 2a and a collar portion 2b and is locked by a press or set screw 2c after the nut portion 2a has been fitted in the collar portion 2b provided with the index member 3, and the mating-index portion 5 is secured to the housing 21.

With the arrangement as described above, after the initial or primary horizontal sighting has been carried out by the automobile manufacturer in a manner similar to that described in the previous embodiment, the press or set screw 2c is loosened, and the collar portion 2b is slidably moved on the nut portion 2a so that the index member 3 confronts or is aligned with the mating-index 8. The set screw 2c is thereafter tightened. Then, the operation and effect exactly the same as those of the previous embodiment are obtained.

Figure 4:
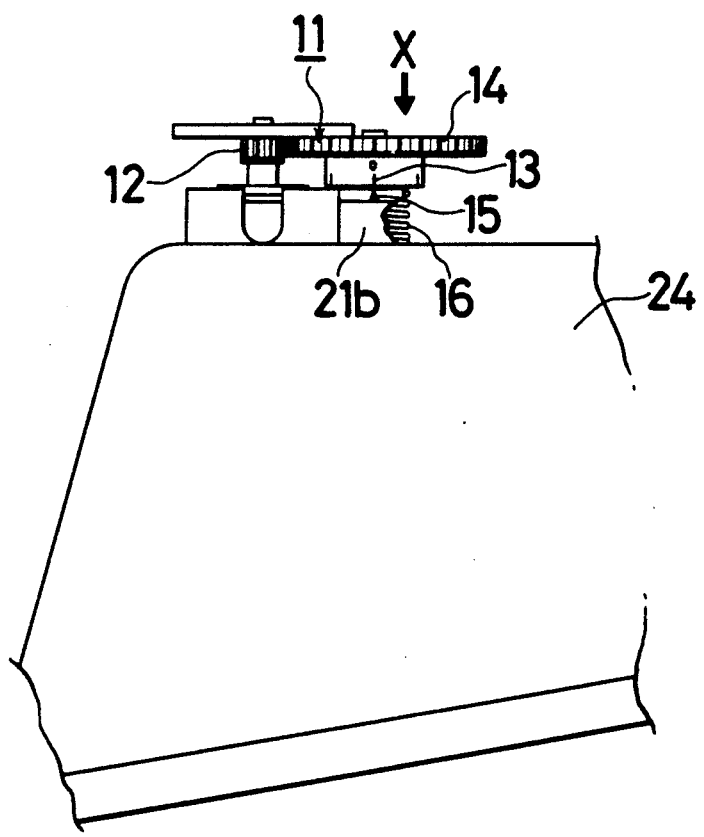
FIG. 4 is a plan view showing essential parts of a third embodiment of the present invention.
Figure 5:
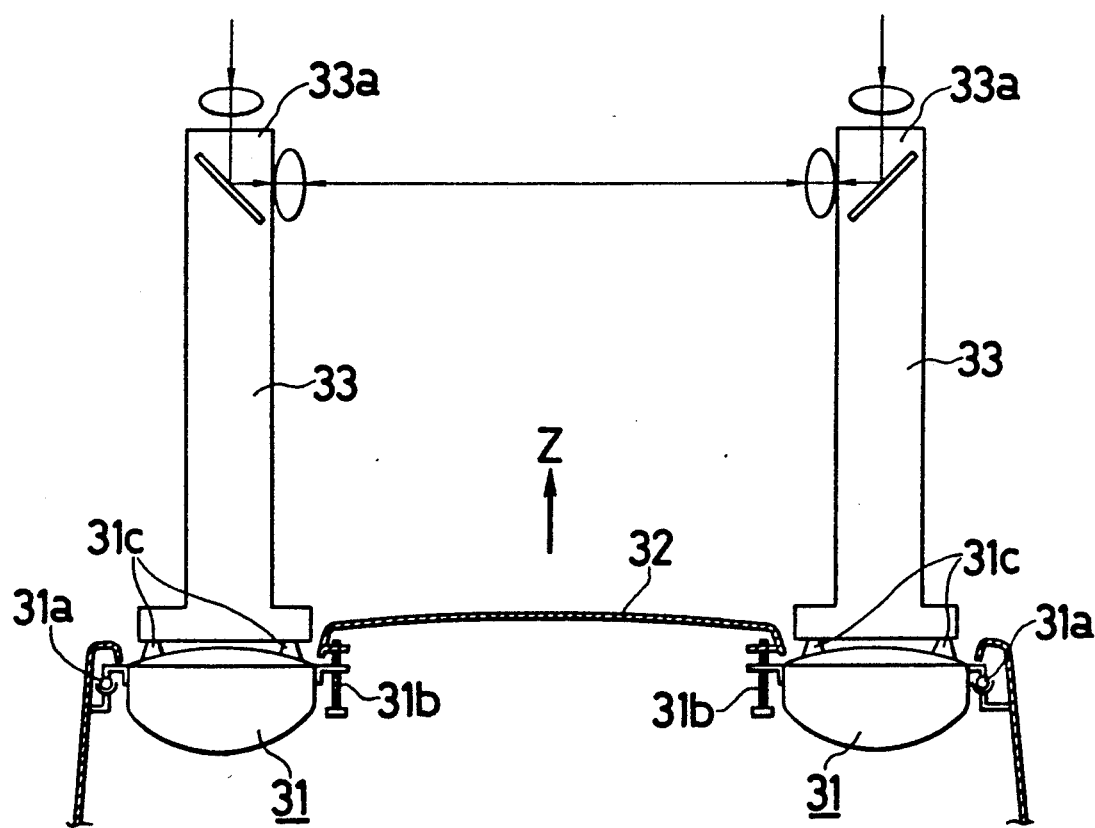
FIG. 5 is an explanatory view showing a conventional horizontal sighting apparatus.

FIG. 4 shows the third embodiment of the present invention. In this embodiment, a first gear 12 as an index portion 11 is secured to the adjusting screw 24. A second gear 14 supported on the housing 24 and provided with an index 13 is meshed with the first gear 12. A projection portion 21, for example, in the form of a cylindrical configuration, is provided at a position confronting the index 13 on the housing 24, and a mating-index 15 forming a mating-index portion is provided.

The second gear 14 is normally biased by means of a spring 16 at a position in engagement with the first gear 12. However, the second gear 14 is released from engagement by being pressed in a direction as indicated by the arrow "X" and the second gear 14 can be freely rotated independently when so released.

In the third embodiment, the automobile manufacturer carries out the primary horizontal sighting in a manner similar to the previous embodiment, in which state the second gear 14 is pressed to release the engagement thereof with the first gear 12. The second gear 14 is rotated to coincide the index 13 with the mating-index 15 to assume the state of the primary horizontal sighting. Since the operation and effect of this embodiment are exactly the same as those of the previous embodiment, a detailed description will not be made.

As described above, according to the present invention, there is provided a horizontal sighting apparatus for head lamps in which an index portion having an index moved by adjusting an adjusting screw is brought into engagement with the adjusting screw, and on a housing, a mating-index portion having a mating-index is provided at a position confronting the index portion, said index portion and said mating-index portion being capable of being aligned with each other irrespective of an adjustment amount of the adjusting screw. Therefore, a state of accurate horizontal sighting carried out, for example, by the automobile manufacturer, can be notified to the automobile repair man or the automobile user. This can provide an excellent advantage in that an accurate horizontal sighting can be realized without requiring a sighting unit or the like. In addition, the automobile manufacturer eliminates the necessity of using a sighting unit or the like at the time of re-adjustment after shipment. There is further provided an advantage of increased design freedom, for example, such as freedom in fixing of lenses.

What is claimed is:

1. A horizontal sighting apparatus for head lamps, wherein the head lamps having a housing and an adjusting screw means for adjusting a horizontal sighting thereof, the apparatus comprising:
    an index portion coupled to the adjusting screw means, and having an index which is moved by adjusting an adjusting screw of the adjusting screw means;
    a mating-index portion coupled to the head lamp housing, and having a mating-index means provided at a position confronting said index portion for cooperating with said index portion; and
    means for moving at least one of said index portion and said mating-index portion for coinciding them with each other irrespective of an adjustment amount of said adjusting screw means;
    said index portion comprising a nut coupled to said adjusting screw and movable only in an axial direction of said adjusting screw, and said index being engaged with and cooperating with said nut; and
    said mating-index portion comprising a mating-index mounted so as to be movable substantially in parallel with the moving direction of said nut and index, and locking means for locking said mating-index portion in a position to which it is moved.

2. The apparatus of claim 1, wherein said mating-index portion is mounted on said housing and extends externally of said housing.

3. A horizontal sighting apparatus for head lamps, wherein the head lamps having a housing and an adjusting screw means for adjusting a horizontal sighting thereof, the apparatus comprising:
    an index portion coupled to the adjusting screw means, and having an index which is moved by adjusting an adjusting screw of the adjusting screw means;
    a mating-index portion coupled to the head lamp housing, and having a mating-index means provided at a position confronting said index portion for cooperating with said index portion; and
    means for moving at least one of said index portion and said mating-index portion for coinciding them with each other irrespective of an adjustment amount of said adjusting screw means;
    said index portion comprising a first gear coupled to said adjusting screw, and a second gear mounted on said housing, said second gear engaging and meshing with said first gear and carrying said index; and
    said mating-index portion is mounted on said housing and comprises a mating-index provided at a position confronting and cooperating with said index carried by said second gear.

4. The apparatus of claim 3, wherein at least one of said first and second gears is movable for disengaging said first and second gears from each other.

5. The apparatus of claim 4, wherein said movable gear is movable in an axial direction thereof for said disengagement.

6. The apparatus of claim 5, wherein a spring is coupled to said movable gear to bias the movable gear to a position where it engages and meshes with the other gear.

* * * * *